United States Patent
Zhu et al.

(10) Patent No.: US 9,916,816 B2
(45) Date of Patent: Mar. 13, 2018

(54) METHOD AND DEVICE FOR PRESENTING INFORMATION

(71) Applicant: Xiaomi Inc., Beijing (CN)

(72) Inventors: Yifan Zhu, Beijing (CN); Wankun Yang, Beijing (CN); Yinli Chen, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 41 days.

(21) Appl. No.: 15/069,984

(22) Filed: Mar. 15, 2016

(65) Prior Publication Data

US 2016/0379603 A1    Dec. 29, 2016

(30) Foreign Application Priority Data

Jun. 29, 2015 (CN) .......................... 2015 1 0369864

(51) Int. Cl.
*G09G 5/37* (2006.01)
*G06F 3/048* (2013.01)
(Continued)

(52) U.S. Cl.
CPC .......... *G09G 5/377* (2013.01); *G06F 1/3265* (2013.01); *G06F 3/0481* (2013.01); *G06F 3/0484* (2013.01); *G06F 3/0488* (2013.01); *G06F 3/04812* (2013.01); *G06F 3/04883* (2013.01); *H04L 51/24* (2013.01); *G06F 2203/04803* (2013.01); *G06F 2203/04804* (2013.01); *G09G 2300/0469* (2013.01); *Y02B 60/1242* (2013.01)

(58) Field of Classification Search
CPC combination set(s) only.
See application file for complete search history.

(56) References Cited

U.S. PATENT DOCUMENTS

2007/0300140 A1    12/2007    Makela et al.
2010/0033498 A1    2/2010    Terasaki et al.
(Continued)

FOREIGN PATENT DOCUMENTS

CN    102945133 A    2/2013
CN    103067596 A    4/2013
(Continued)

OTHER PUBLICATIONS

Droid Life, "Nexus 6 Feature: Ambient Display", YouTube, Nov. 3, 2014, pp. 1-3, Retrieved from the Internet: URL: https://www.youtube.com/watch?v=5Tyha0jME5g.
(Continued)

*Primary Examiner* — Wesner Sajous
(74) *Attorney, Agent, or Firm* — Jun He Law Offices P.C.; James J. Zhu

(57) ABSTRACT

A method for presenting information includes: receiving a notification message when a display screen is in a screen-off state; and presenting the notification message on the display screen with darkening a selected object, when the display screen is switched into a screen-on state from the screen-off state. Herein the selected object comprises all or partial content displayed on the display screen except the notification message. Accordingly, the selected object can be darkened and hidden on the display screen while the notification message can be highlighted.

25 Claims, 9 Drawing Sheets

(51) Int. Cl.
  *G06F 1/32* (2006.01)
  *G09G 5/377* (2006.01)
  *H04L 12/58* (2006.01)
  *G06F 3/0488* (2013.01)
  *G06F 3/0481* (2013.01)
  *G06F 3/0484* (2013.01)

(56) References Cited

U.S. PATENT DOCUMENTS

| | | | |
|---|---|---|---|
| 2010/0159995 | A1 | 6/2010 | Stallings et al. |
| 2010/0227651 | A1 | 9/2010 | Kim |
| 2011/0256848 | A1 | 10/2011 | Bok et al. |
| 2013/0102281 | A1 | 4/2013 | Kanda et al. |
| 2013/0178248 | A1 | 7/2013 | Chen |
| 2014/0141841 | A1 | 5/2014 | Yeo et al. |
| 2015/0358577 | A1* | 12/2015 | Zhou ............... H04L 51/10 348/14.01 |
| 2016/0062570 | A1* | 3/2016 | Dascola ............ G06F 3/0482 715/765 |
| 2016/0360382 | A1* | 12/2016 | Gross .............. G06F 3/0488 |

FOREIGN PATENT DOCUMENTS

| | | |
|---|---|---|
| CN | 103226384 A | 7/2013 |
| CN | 103500079 A | 1/2014 |
| CN | 103631547 A | 3/2014 |
| CN | 104166454 A | 11/2014 |
| CN | 104615920 A | 5/2015 |
| JP | 2002-125012 A | 4/2002 |
| JP | 2010039848 A | 2/2010 |
| KR | 1020110103089 A | 4/2012 |
| KR | 20130081617 A | 7/2013 |
| KR | 20140065955 A | 5/2014 |
| RU | 2310926 C1 | 11/2007 |
| RU | 2523040 C2 | 7/2014 |
| RU | 2013118261 A | 11/2014 |

OTHER PUBLICATIONS

Alexander Donst, "Ambient Display", YouTube, Nov. 24, 2014, pp. 1-2, Retrieved from the Internet: URL: https://www.youtube.com/watch?v=T6AB88jNJUE.
Extended European Search Report of EP16169057.
International Search Report for PCT/CN2015/095144.

* cited by examiner

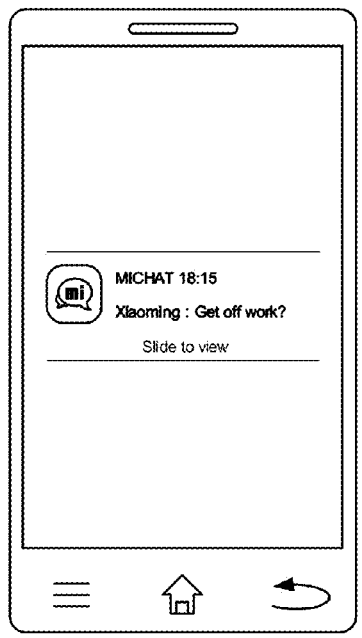
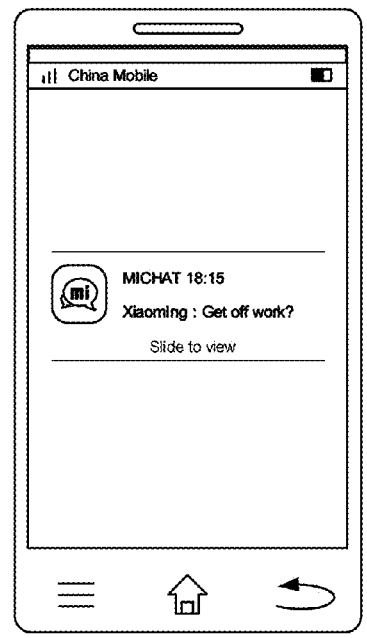
Fig. 1D  Fig. 1E
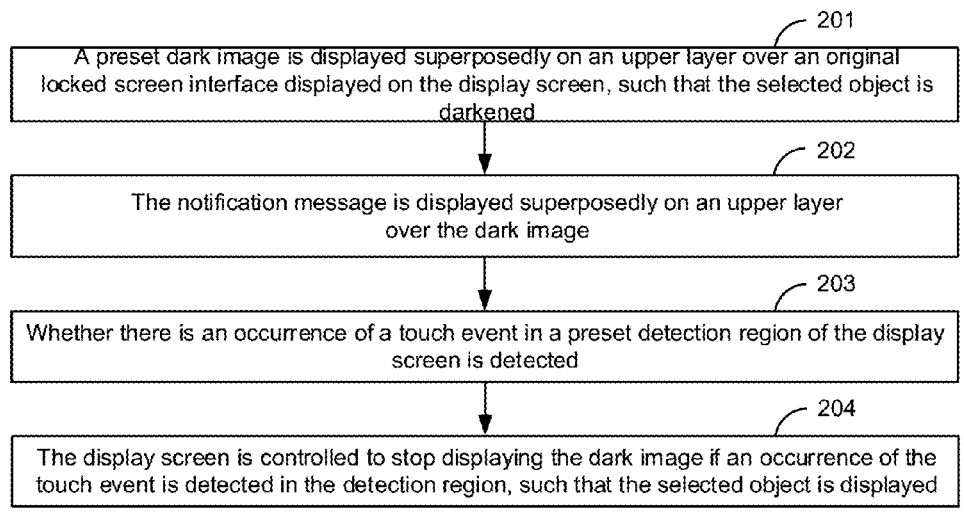
Fig. 2A

METHOD AND DEVICE FOR PRESENTING INFORMATION

CROSS-REFERENCE TO RELATED APPLICATIONS

This application claims priority to Chinese Patent Application 201510369864.5, filed Jun. 29, 2015, the entire contents of which are incorporated herein by reference.

TECHNICAL FIELD

The present disclosure generally relates to communication technology, and more particularly, to a method and a device for presenting information.

BACKGROUND

With development of terminal technology, more and more novel functions are developed in terminal devices in order to satisfy a variety of user needs. A display interface of the terminal device in a screen-locked state is one of the most common interfaces of user touchable terminal system. In the prior art, when there are notification messages to be presented on a display of the terminal device in screen-off state, the display screen may switch from the screen-off state into a screen-on state, and then present contents such as weather, date, state information and the notification messages mentioned above.

SUMMARY

According to a first aspect of the embodiments of the present disclosure, there is provided a method for presenting information. The method includes: receiving a notification message when a display screen is in a screen-off state; and presenting the notification message on the display screen with darkening a selected object, when the display screen is switched into a screen-on state from the screen-off state; wherein the selected object includes all or partial content displayed on the display screen except the notification message.

According to a second aspect of the embodiments of the present disclosure, there is provided a device for presenting information, including: a processor; and a memory for storing instructions executable by the processor and a display screen; wherein the processor is configured to perform: receiving a notification message when the display screen is in a screen-off state; and darkening a selected object on the display screen and present the notification message, when the display screen is switched into a screen-on state from the screen-off state; wherein the selected object includes all or partial content displayed on the display screen except the notification message.

According to a third aspect of the embodiments of the present disclosure, there is provided a non-transitory computer-readable storage medium having stored therein instructions that, when executed by a processor of a device, causes the device to perform a method for presenting information, the method including: receiving a notification message when a display screen is in a screen-off state; and presenting the notification message on the display screen with darkening a selected object, when the display screen is switched into a screen-on state from the screen-off state; wherein the selected object comprises all or partial content displayed on the display screen except the notification message.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1D is a schematic diagram illustrating another presentation of a notification message on a display screen of a terminal device according to an exemplary embodiment of the present disclosure.

FIG. 1E is a schematic diagram illustrating another presentation of a notification message on a display screen of a terminal device according to an exemplary embodiment of the present disclosure.

FIG. 2A is a flow chart illustrating another method for presenting information according to an exemplary embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms in the present disclosure are used merely for purpose of description of particular embodiments instead of limitation on the present disclosure. Singular terms such as "a/an", "said" and "the" used in the present disclosure and appended claims are intended to include plural meanings thereof, unless otherwise explicitly indicated in context. It should be also noted that, term "and/or" used herein refers to and includes any or all possible combination of one or more associated items as listed.

It should be noted that, although terms like "first", "second", and "third" may be used in the present disclosure to describe a variety of elements, those elements should not be limited thereto. Those terms are used merely for distinguishing elements of the same type from each other. For example, a first message may also be referred to as a second message without departing from scope of the present disclosure. Similarly, the second message may also be referred to as the first message. The word "if" used herein may be understood as "at the time of" or "when" or "in response to determination of" depending on the context thereof.

Figure 1A:
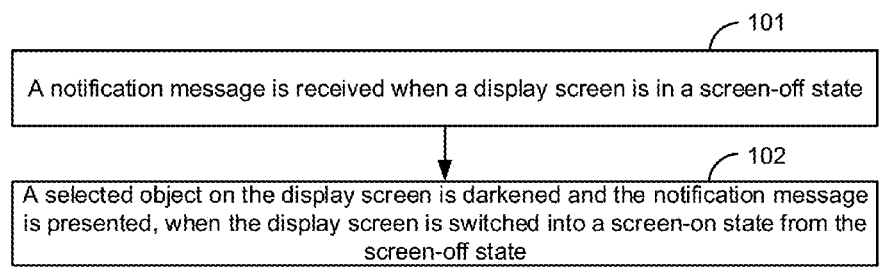
FIG. 1A is a flow chart illustrating a method for presenting information according to an exemplary embodiment of the present disclosure.

FIG. 1A is a flow chart illustrating a method for presenting information according to an exemplary embodiment. As shown in FIG. 1A, the method is applicable in a terminal device or a device and includes following steps.

In step 101, a notification message is received when a display screen is in a screen-off state.

In step 102, a selected object on the display screen is darkened and the notification message is presented, when the display screen is switched into a screen-on state from the screen-off state.

In an embodiment, the selected object includes all or partial display content except the notification message displayed on the display screen.

In the embodiment of the present disclosure, the terminal device may be a smart terminal device, for example, a smart mobile phone, a tablet computer, a PDA (Personal Digital Assistant), an e-book reader, a multimedia player and the like.

In the embodiment provided by the present disclosure, the screen-off state refers to a state in which the display screen is not electrified and thus is not lighted up. In the screen-off state, the terminal device is in a locked state. Generally, the locked state of the terminal device may not be released until an unlock instruction is received from a user. When the user clicks a power button or a home button (the terminal device is in locked state at the moment), the display screen is electrified and thus is in a lighted up state, and the display screen usually displays objects predefined by the system such as a wallpaper, a weather widget, a time widget, a toolbar widget, an application and the like. Moreover, interface layout and display content of respective objects, such as size and position of characters, display mode and position of respective widgets and the like, displayed on the display screen can be set in advance. In an embodiment, format of date and time may be displayed in a form of year/month/day or day/month/year. Furthermore, font type and font size of temperature displayed in the weather widget, or display position of weather icons therein, may be set in advance.

In the embodiment provided by the present disclosure, the notification message includes a message received in a screen-off and screen-locked state of the terminal device, which shall be presented on the display screen when the display screen is switched to a screen-on state. The notification message may be a message generated by an application program installed in the terminal device, for example, a short message generated by a short message application, an instant communication message generated by an SNS (Social Networking Service) application, an email notification message generated by a mail application, push message generated by a variety of other applications, and the like. Such a notification message may be displayed on the display screen in a locked state. In general, the presentation parameter of the notification message may be set by user. For example, the display screen may be lighted up and the whole content of the notification message is displayed therein, or the display screen may be lighted up and a brief prompt is displayed therein, upon receiving the notification message. The presentation parameter may also include position, font size, font color or the like of the notification message on the display screen.

Figure 1B:
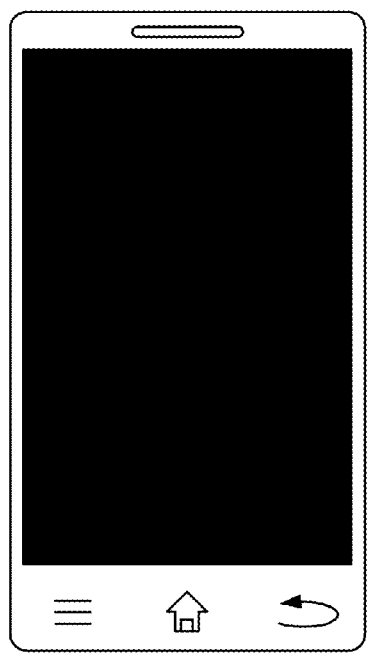
FIG. 1B is a schematic diagram illustrating a screen-off state of a terminal device according to an exemplary embodiment of the present disclosure.
Figure 1C:
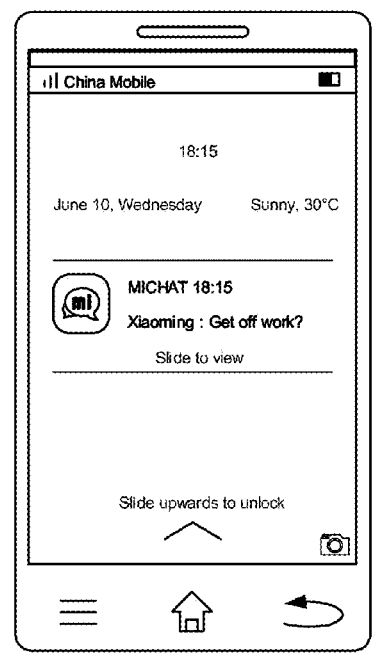
FIG. 1C is a schematic diagram illustrating a presentation of a notification message on a display screen of a terminal device according to an exemplary embodiment of the present disclosure.

When the terminal device is in the screen-off state, the display screen is not lighted up, as shown in FIG. 1B, which is a schematic diagram illustrating the screen-off state of the terminal device according to the present disclosure. When the notification to be displayed is received, the display screen of the terminal device is electrified and lighted up, such that the notification message is displayed on the display screen, as shown in FIG. 1C, which is a schematic diagram illustrating a presentation of the notification message on the display screen of the terminal device according to the present disclosure. As can be seen from FIGS. 1B and 1C, the display screen is not lighted up when the terminal device is in the screen-off state. When the terminal device receives the notification message generated by an application, the display screen is electrified to display the notification message. The display screen shown in FIG. 1C displays a toolbar widget, a time widget, a date widget, a weather widget, a Michat™ notification message, and an icon of a camera application. As can be seen from FIG. 1C, a lot of contents are displayed on the display screen, which has a poor presentation effect since the user's attention to the notification message is distracted.

In the present embodiment, however, when a notification message is received, the display screen is switched into the screen-on state from the screen-off state, a selected object on the display screen is darkened and the notification message is displayed. Herein, the selected object may include all or partial content displayed on the display screen except the notification message. FIG. 1D is a schematic diagram illustrating another presentation of the notification message on the display screen of the terminal device according to the present disclosure. As can be seen from FIG. 1D, only the notification message is presented on the display screen in the embodiment of the present disclosure, such that the content presented on the display screen is more concise, which facilitates the user to focus on the notification message quickly. Thus, the presentation effect of the display screen is better and the user experience is better.

In the embodiment shown in FIG. 1D, the selected object includes all content displayed on the display screen except the notification message, only the notification message is presented on the display screen. In other alternative embodiments, the selected object may also include part of the content displayed on the display screen excluding the notification message. In other words, besides the notification message, other contents such as an application icon or a toolbar widget, may be also presented on the display screen.

FIG. 1E is a schematic diagram illustrating another presentation of the notification message on the display screen of the terminal device according to the present disclosure. As can be seen from FIG. 1E, the notification message and a toolbar widget are presented on the display screen, the selected object includes part of the content displayed on the display screen except the notification message. The toolbar widget is not included in the selected object. Much less content is displayed in the embodiment shown in FIG. 1E compared with that shown in FIG. 1C, such that the content presented on the display screen is more concise and is easier to be read, which facilitating the user to focus on the notification message quickly. Thus, the presentation effect of the display screen becomes better and the user experience becomes better.

The selected object as described above can be configured flexibly depending on actual needs in practice. The present disclosure makes no limitation on it.

Herein, two methods described as follows can be used to darken and hide the selected object on the display screen and presenting the notification message when the display screen is switched into the screen-on state from the screen-off state.
Mode I:

The dark image is superposedly displayed on an upper layer over an original locked screen interface displayed on the display screen, such that the selected object is darkened and hidden.

In the present embodiment, the procedures described above can be implemented in the application layer of an operating system of the terminal device and are applicable to a variety of display screens such as an LCD (Liquid Crystal Display).

In an embodiment, the original locked screen interface refers to a display interface preset when the display screen is switched into the screen-on state from the screen-off state. The dark image is an image that fully covers the original locked screen interface or an image that covers the selected object, and the transparency of the dark image is below a preset threshold.

In an embodiment, the original locked screen interface or the selected object should not be covered by the dark image in a transparent mode so as to ensure shading effect of the dark image. The preset threshold herein may be 100% transparency.

In view of above description of the dark image, there are also two manners in presenting the notification message as follows.

In a first manner, the dark image is an image that fully covers the original locked screen interface and the notification message is superposedly displayed on the upper layer over the dark image.

In the first manner, the original locked screen interface means a preset display interface when the display screen is switched into the screen-on state from the screen-off state. In order to highlight the presentation of the notification message, the dark image can be superposedly displayed on the upper layer over the original locked screen interface. The dark image is used to darken and hide the selected object. The transparency of the dark image may below a preset threshold and the dark image may cover the original locked screen interface entirely. In practice, the transparency can be flexibly set as required. When the transparency of the dark image is below a certain threshold, the dark image is able to shade the original locked screen interface, such that the selected object can be darkened and hidden. The dark image may be a dark color image, a black image and the like, which can be selected according to actual requirement in practice and is not limited by the present disclosure.

When the original locked screen interface is entirely covered by the dark image, the notification message can be further displayed superposedly on the upper layer over the dark image. The notification message may be displayed in a variety of forms such as highlighting or displaying with an inverse color of the dark image. For example, if the dark image is a green image, the notification message may be displayed in red, thereby achieving a highlighting effect.

In a second manner, the dark image is an image that covers the selected object and the notification message is displayed on the display screen.

In the second manner, the transparency of the dark image may be below a preset threshold so as to shade the selected object, such that the selected object can be darkened and hidden. When the selected object is covered by the dark image, the notification message can be presented on the display screen.

In the embodiment of the present disclosure, the dark image is an image that covers the original locked screen interface entirely or an image that covers the selected object. The transparency of the dark image is below the preset threshold. Accordingly, by shading the selected object with the dark image, the selected object can be darkened and the presentation of the notification message can be effectively highlighted. Thus, the presented content on the display screen is concise and easy to be read, and a user can focus on the notification message quickly when the user views the display screen, thereby improving the user experience.
Mode II:

A first group of pixels of the display screen are set to a power-on state, such that the notification message is displayed, wherein the first pixels correspond to a display region for the notification message.

A second group of pixels of the display screen are set to a power-off state, such that the selected object is darkened and hidden, wherein the second group of pixels correspond to a display region for the selected object.

In the present embodiment, the procedures described above can be implemented in a hardware layer of the operating system of the terminal device and is applicable to a variety of display screens such as an OLED (Organic Light-Emitting Diode). In the embodiment, the display region for the notification message, i.e., a position of the notification message on the display screen, is acquired. The first group of pixels refer to pixels corresponding to the display region, and when the pixels corresponding to the display region are electrified, they are lighted up, such that the notification message is presented on the display region. The second group of pixels refer to pixels corresponding to a display region for the selected object. The second group of pixels are set to a power-off state, such that the selected object is darkened and hidden.

In the present embodiment, when the notification message is to be presented, the pixels corresponding to the display region for the notification message are set to the power-on state, while the pixels corresponding to the display region for the selected object are set to the power-off state. Accordingly, the notification message can be highlighted on the display screen, such that the content presented on the display screen is concise and easy to be read, which helps a user focus on the notification message quickly. The presentation effect of the display screen is improved. Furthermore, power consumption of the terminal can be also reduced since only the first pixels are set to the power-on state while the second pixels are set to the power-off state.

In an optional embodiment, the step of presenting the notification on the display screen may include following steps.

If a plurality of notification messages are received, a presentation parameter of each notification message is determined according to the priority of the notification message.

In an embodiment, the presentation parameter of the notification messages correspond to different priorities may be the same or different, and the presentation parameter includes any one or more of presented order, luminance value, font type, font size and color value.

Thereafter, the notification messages are presented on the display screen according to the presentation parameter of the notification message.

In the present embodiment, the notification message may be a message generated by an application program installed in the terminal device, for example, a short message generated by a short message application, an instant communication message generated by an SNS (Social Networking Service) application, an email notification message generated by a mail application, push message generated by other kinds of applications, and the like. When a plurality of notification messages are received during the screen-off state of the terminal device, the notification messages can be presented in different presentation parameters according to a user's interestingness in different notification messages.

In an embodiment, the priority may be set in advance depending on different applications, or may be set according to various factors such as frequency of use by the user or frequency of receiving the notification message. For example, notification messages from the SNS application may be set to a highest priority, while notification messages from a system-level application such as system update may be set to a lower priority. Optionally, notification messages generated by a same application can be set to different priorities. For example, generally there may be a plurality of chat friends involved in an SNS application. Different friends can be set to different priorities. In the embodiment, the priority can be set flexibly according to actual needs and is not limited thereto.

The presentation parameter of the notification messages correspond to different priorities may be the same or different, and the presentation parameter includes any one or more of presented order, luminance value, font type, font size and color value. When the notification messages are presented, the notification messages can be presented on the display screen according to their presentation parameter.

In the present embodiment, the presentation parameter of each notification message is determined according to the notification message. The presentation parameters of the notification messages corresponding to different priorities may be the same or different. The notification messages can be presented in any one or more presentation parameters of presented order, luminance value, font type, font size and color value. Accordingly, the notification messages can be presented with diversity of forms, thus user experience can be improved.

FIG. 2A is a flow chart illustrating a method for presenting information according to an exemplary embodiment, the method is applicable in the terminal device. On the basis of the embodiments described above, this method describes how to darken and hide the selected object on the display screen and present the notification message. The process includes the following steps.

In step 201, a preset dark image is displayed superposedly on an upper layer over an original locked screen interface displayed on the display screen, such that the selected object is darkened.

It should be noted that, a dark image that covers the original locked screen interface entirely is taken as an example for description.

In step 202, the notification message is displayed superposedly on an upper layer over the dark image.

In step 203, it is detected whether a touch event occurs in a preset detection region of the display screen.

In an embodiment, the detection region is an arbitrary region of the display screen.

In step 204, if an occurrence of the touch event is detected in the detection region, the display screen is controlled to stop displaying the dark image and displays the selected object.

It should be further noted that, in view of the description of different formats of the dark image, the notification messages can be presented in different manners accordingly. Moreover, in view of two presentation modes described above, the first one is taken as an example to describe the implementation manner shown in FIG. 2A. However, when the second presentation mode is performed, only the implementation manner in step 202 is required to be substituted for displaying the notification message on the display screen, while the implementation manner for other steps are the same as that described with FIG. 2A and, thus is not elaborated herein.

The present embodiment can be implemented in the application layer of the operating system of the terminal and is applicable to a variety of display screens such as an LCD (Liquid Crystal Display). In the embodiment, the original locked screen interface refers to a preset display interface when the display screen is switched into the screen-on state from the screen-off state. In order to highlight presentation of the notification message, the dark image can be superposedly displayed on the upper layer over the original locked screen interface and used to darken and hide the selected object. The transparency of the dark image may be below a preset threshold and the dark image may cover the original locked screen interface entirely. In practice, the transparency can be flexibly set as required. With a transparency is below a certain threshold, the dark image may shade the display effect of the original locked screen interface, which achieves the purpose of darkening the selected object. The dark image may be a dark color image, a black colored image and the like, which can be flexibly selected in practice and is not limited by the present disclosure.

When the original locked screen interface is entirely covered by the dark image, the notification message can be further displayed superposedly on the upper layer over the dark image. The notification message may be displayed in a highlighted way or displayed with an inverse color of the dark image. For example, if the dark image is a green image, the notification message may be displayed in red, thereby achieving an effect of highlighted display.

In order to control the display screen to stop displaying the dark image, an instruction may be output from the application layer to the display screen in the hardware layer to notify the display screen to stop displaying the dark image. In practice, the dark image may be displayed superposedly on the upper layer over the original locked screen interface in various manners in the application layer. For example, display of the dark image may be implemented by defining a view object or by defining a window object. The event that triggers the display screen to remove the dark image may be close or deletion of a view, or close of a window and so on. These events notify the display screen to stop displaying the dark image.

Figure 2B:
FIG. 2B is a schematic diagram illustrating display of an original locked screen interface on a display screen according to an exemplary embodiment of the present disclosure.
Figure 2C:
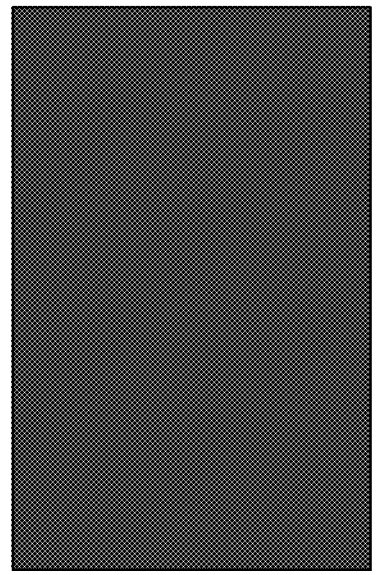
FIG. 2C is a schematic diagram illustrating a dark image according to an exemplary embodiment of the present disclosure.
Figure 2D:
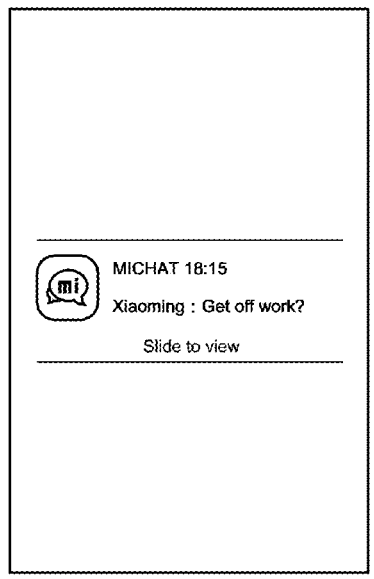
FIG. 2D is a schematic diagram illustrating a notification message according to an exemplary embodiment of the present disclosure.
Figure 2E:
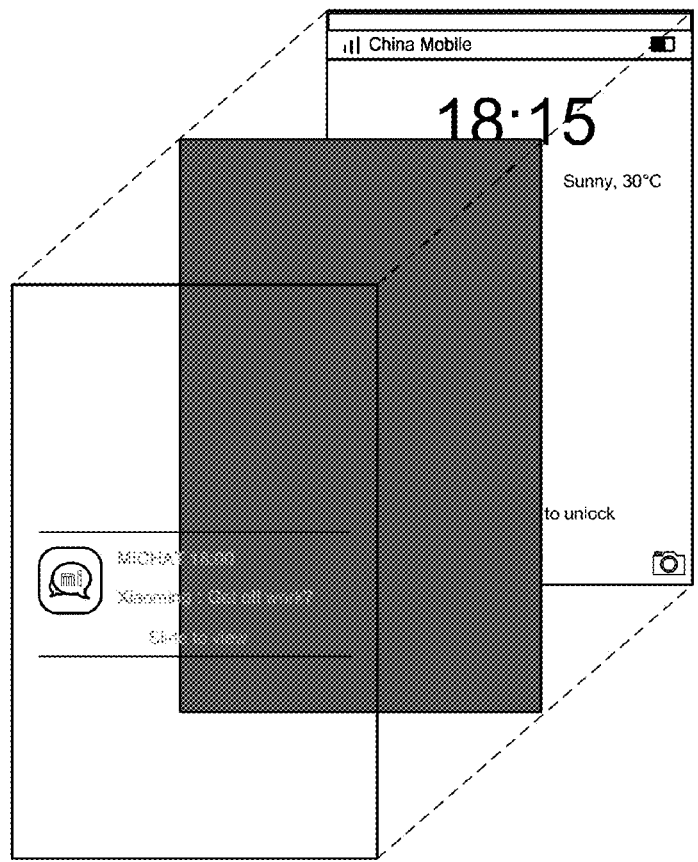
FIG. 2E is a schematic diagram illustrating a superposed display of a notification message, a dark image and an original locked screen interface according to an exemplary embodiment of the present disclosure.
Figure 2F:
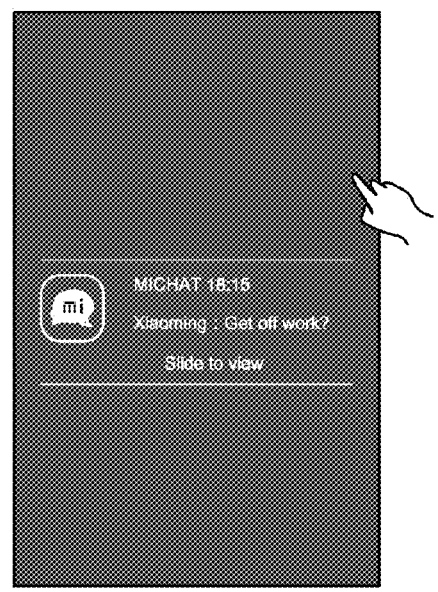
FIG. 2F is a schematic diagram illustrating a presentation of a notification message on a display screen according to an exemplary embodiment of the present disclosure.

FIG. 2B is a schematic diagram illustrating display of the original locked screen interface on the display screen according to the present disclosure. As shown in FIG. 2B, the selected object is displayed on the original locked screen interface, and a dark image may be displayed superposedly on an upper layer over the original locked screen interface. FIG. 2C is a schematic diagram illustrating a dark image according to the present disclosure. As shown in FIG. 2C, a black image with a transparency of 0 (zero) is used as the dark image for darkening the selected object, such that the selected object is not visible. FIG. 2D is a schematic diagram illustrating the notification message according to the present disclosure. FIG. 2E is a schematic diagram illustrating a superposed display of the notification message, the dark image and the original locked screen interface according to the present disclosure. As shown in FIG. 2E, the dark image is displayed superposedly on the upper layer over the original locked screen interface, and then the notification message is displayed superposedly on the upper layer over the dark image, an overall effect of display is shown in FIG. 2F, which is a schematic diagram illustrating a presentation of the notification message on the display screen according to the present disclosure. As shown in FIG. 2F, the notification message is presented with a white font, which is an inverse color of the dark image, such that the notification message can be displayed in a more highlighted way when it is superposed on the upper layer over the dark image. As can be seen from FIG. 2F, only the notification message is displayed on the display screen of the terminal device in the present embodiment, while other objects, which are irrelevant with the notification message, are darkened and hidden. Accordingly, the content on the display screen is more concise, which helps a user focus on the notification message quickly, and the presentation effect of the display screen as well as better user experience are improved.

Since only the notification message is displayed on the display screen, the selected object can be displayed when the user wants to view the selected object. To this end, a detection region can be preset on the display screen, which may be an arbitrary region of the display screen, such as a whole region of the display region, a middle region of the display region or the like. The touch event may be a click event, a double-click event, a slide event or the like. The detection region and the touch event described above may be selected flexibly by those skilled in the art as required and are not limited in the embodiment of the present disclosure.

If an occurrence of touch event is detected in the detection region, the display screen is controlled to stop displaying the dark image and display the selected object. For example, as shown in FIG. 2F, the detection region of the embodiment may be the whole region of the display screen and the click event is set as the touch event. When the user clicks an upper right region on the display screen, the display screen is controlled to stop displaying the dark image and the original locked screen interface is no longer covered by the dark image, such that the selected object becomes visible for the user to quickly view some frequently-used information on the display screen, thereby improving the user experience.

As can be seen from the embodiment described above, the preset dark image is displayed superposedly on the upper layer over the original locked screen interface displayed on the display screen according to the embodiment, thus the selected object can be darkened. Moreover, the notification message is displayed superposedly on the dark image. In this way, the notification message can be presented in a highlighted way with this presentation parameter such that the content presented on the display screen is concise and easy to be read, which helps the user focus on the notification message quickly when viewing the display screen, thereby improving the user experience.

Figure 3A:
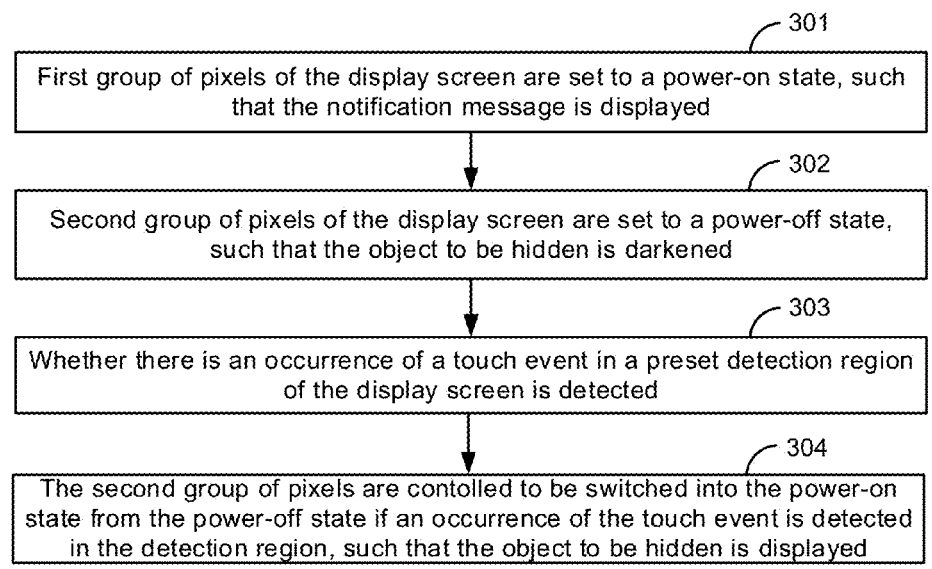
FIG. 3A is a flow chart illustrating another method for presenting information according to an exemplary embodiment of the present disclosure.

FIG. 3A is a flow chart illustrating another method for presenting information according to an exemplary embodiment. The method is applicable in a terminal device. Based on the embodiments described previously, this method describes a process of darkening the selected object on the display screen and presenting the notification message when the display screen is switched into the screen-on state from the screen-off state. The process includes following steps.

In step 301, the first group of pixels of the display screen are set to a power-on state, such that the notification message is displayed.

In an embodiment, the first group of pixels correspond to a display region for the notification message.

In step 302, a second group of pixels of the display screen are set to a power-off state, such that the selected object is darkened.

In an embodiment, the second group of pixels correspond to a display region for the selected object.

In step 303, it is detected whether there is an occurrence of a touch event in a preset detection region of the display screen.

In an embodiment, the detection region is an arbitrary region of the display screen.

In step 304, the second pixels are set to be switched into the power-on state from the power-off state when an occurrence of the touch event is detected in the detection region, such that the selected object is displayed.

In an embodiment, the procedure described above can be implemented in the hardware layer of the operating system of the terminal device and is applicable in a variety of display screens such as an OLED. Basic structure of an OLED includes a transparent thin Indium Tin Oxide (ITO) layer having semiconductor property, which is connected to a positive electrode of a power supply and then connected to a metallic cathode. The whole structure of OLED is a layered structure including a hole transmission layer, a light emission layer and an electron transmission layer. When the power supply is tuned to a proper voltage, the positive holes and the negative charges will combine together in the light emission layer and light is generated. Three additive primary colors RGB (red, green, blue) are generated with different formulas to constitute basic colors.

In the present embodiment, a display region for the notification message, i.e., a position for presenting the notification message on the display screen, is acquired. The first group of pixels refer to pixels corresponding to the display region for the notification message, and when the pixels corresponding to the display region for the notification message are electrified, they are lighted up, such that the notification message is presented on the display region. The second group of pixels, i.e., the pixels corresponding to a display region for the selected object, are set to a power-off state, such that the selected object is darkened.

Figure 3B:
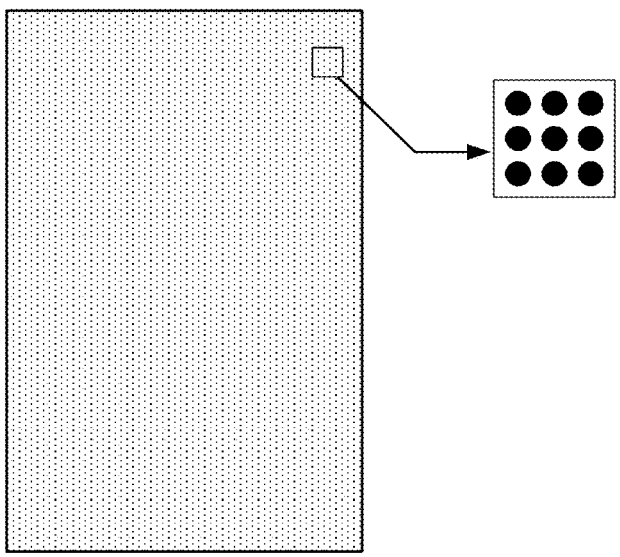
FIG. 3B is a schematic diagram illustrating an OLED display screen and its partial enlarged view according to an exemplary embodiment of the present disclosure.
Figure 3C:
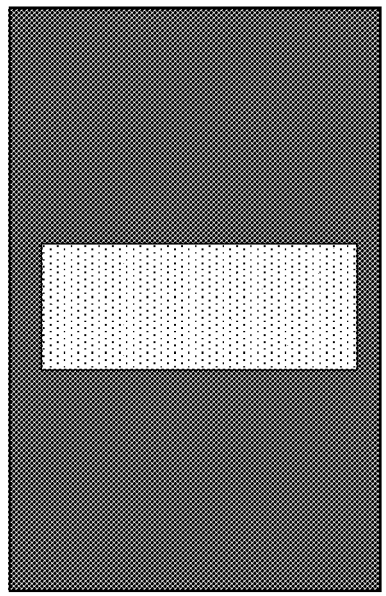
FIG. 3C is a schematic diagram illustrating a first group of pixels being in a power-on state according to an exemplary embodiment of the present disclosure.
Figure 3D:
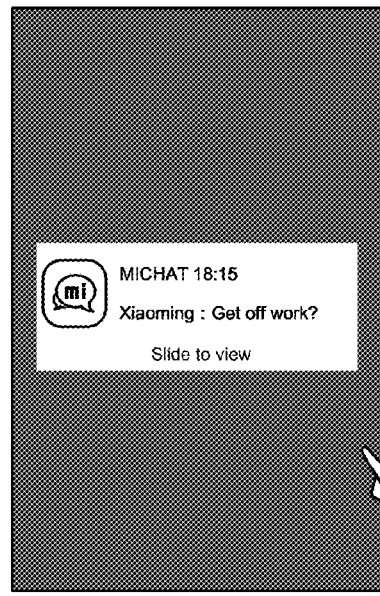
FIG. 3D is a schematic diagram illustrating another presentation of a notification message on a display screen according to an exemplary embodiment of the present disclosure.

For example, FIG. 3B is a schematic diagram illustrating an OLED display screen and its partial enlarged view according to the present disclosure. The display screen includes a plurality of pixels. The pixels are lighted up in the power-on state, such that a terminal interface is displayed. The pixels are extinguished when they are in the power-off state. FIG. 3C is a schematic diagram illustrating a first group of pixels being in a power-on state according to the present disclosure. As shown in FIG. 3C, based on the display region for the notification message, pixels corresponding to the display region are electrified, that is, the first group of pixels are in the power-on state, such that the notification message can be presented with a display effect as shown in FIG. 3D, which is a schematic diagram illustrating another presentation of the notification message on the display screen according to the present disclosure.

Besides the notification message, the selected object can also be displayed when a user wants to view the selected object. To this end, a detection region can be preset on the display screen, which may be an arbitrary region of the display screen, for example, the whole region of the display region, or a middle region of the display region. The touch event may be a click event, a double-click event, a slide event or the like. The detection region and the touch event described above may be selected flexibly by those skilled in the art as required and are not limited in the embodiment of the present disclosure.

When an occurrence of the touch event is detected in the detection region, the display screen is controlled to stop displaying the dark image such that the selected object can be displayed. For example, as shown in FIG. 3D, the detection region is the whole region of the display screen except the display region for the notification, and the click event is the touch event. When the user clicks at a lower right region on the display screen, the second group of pixels are switched into the power-on state from the power-off state so as to display the selected object. Accordingly, the selected object is visible which enable the user to quickly view other frequently-used information on the display screen, thereby improving the user experience.

As can be seen from the embodiment described above, when the notification message is presented, the pixels corresponding to the display region for the notification message are set to the power-on state and the pixels corresponding to the display region for the selected object are set to the power-off state. So the notification message can be presented in a highlighted way on the display screen, such that the content presented on the display screen is concise and easy to be read, which helps the user to focus on the notification message quickly and achieves a better presentation effect of the display screen. Moreover, power consumption of the terminal device can be also reduced since only the first group of pixels are set to the power-on state while the second group of pixels are set to the power-off state.

Figure 4:
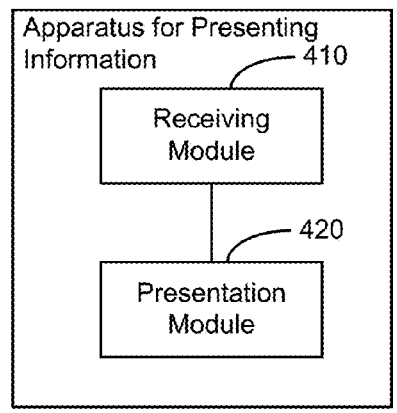
FIG. 4 is a block diagram illustrating an apparatus for presenting information according to an exemplary embodiment of the present disclosure.

FIG. 4 is a block diagram illustrating an apparatus for presenting information according to an exemplary embodiment of the present disclosure. As shown in FIG. 4, the apparatus includes a receiving module 410 and a presentation module 420.

In an embodiment, the receiving module 410 is configured to receive a notification message when a display screen is in a screen-off state.

The presentation module 420 is configured to darken a selected object on the display screen and to present the notification message received by the receiving module 410, when the display screen is switched into a screen-on state from the screen-off state.

In an embodiment, the selected object includes all or partial content displayed on the display screen except the notification message.

As can be seen from the embodiment described above, when the notification message is received when the display screen is in the screen-off state, the display screen is switched into the screen-on state to present the notification message, while all or partial content displayed on the display screen except the notification message is darkened. Accordingly, the notification message can be presented in a highlighted way on the display screen in the present disclosure, such that presented content on the display screen is concise and easy to be read, which helps a user to focus on the notification message quickly and achieves a better presentation effect of the display screen, thereby improving the user experience.

Figure 5:
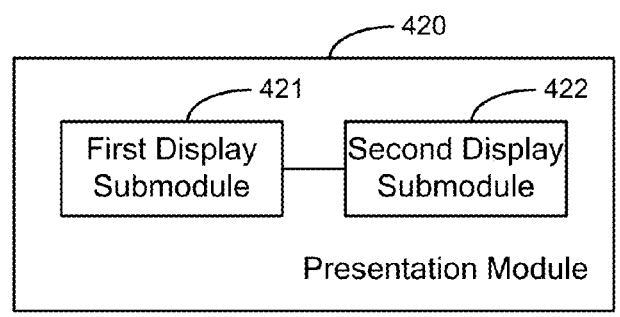
FIG. 5 is a block diagram illustrating another apparatus for presenting information according to an exemplary embodiment of the present disclosure.

FIG. 5 is a block diagram illustrating another apparatus for presenting information according to an exemplary embodiment of the present disclosure. On the basis of the previously described embodiment as shown in FIG. 4, the presentation module 420 includes a first display submodule 421 and a second display submodule 422.

In an embodiment, the first display submodule 421 is configured to display a preset dark image superposed on an upper layer over an original locked screen interface displayed on the display screen, such that the selected object is darkened.

In an embodiment, the original locked screen interface refers to a display interface preset when the display screen is switched into the screen-on state from the screen-off state. The dark image is an image that fully covers the original locked screen interface or an image that covers the selected object, and the transparency of the dark image is below a preset threshold.

The second display submodule 422 is configured to display the notification message superposed on an upper layer over the dark image displayed by the first display submodule 421 if the dark image is configured to cover the original locked screen interface entirely.

Alternately, the second display submodule 422 is configured to display the notification message on the display screen if the dark image is configured to cover the selected object.

It should be noted that, an image that fully covers the original locked screen interface is taken as an example of the dark image in the apparatus according to the embodiment illustrated in FIG. 4. In other words, there is a connection depicted between the first display submodule 421 and the second display submodule 422.

As can be seen from the embodiment described above, the dark image in the present disclosure may be an image that covers the original locked screen interface entirely or an image that covers the selected object, and has the transparency of the dark image is below the preset threshold. Accordingly, the selected object can be shaded by the dark image, such that the selected object can be darkened and the notification message can be highlighted. Thus, the content presented on the display screen is concise and easy to be read, which helps a user focus on the notification message quickly when viewing the display screen, thereby improving the user experience.

Figure 6:
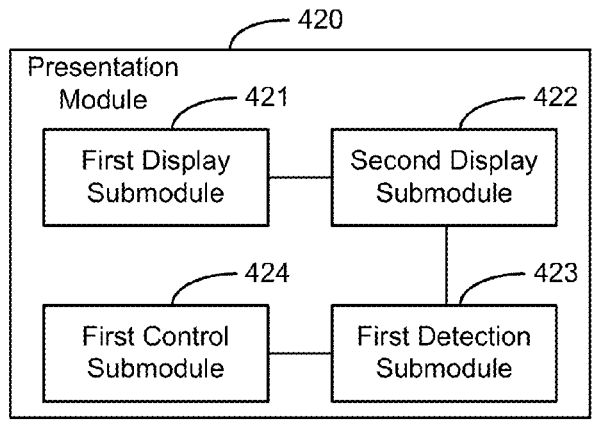
FIG. 6 is a block diagram illustrating another apparatus for presenting information according to an exemplary embodiment of the present disclosure.

FIG. 6 is a block diagram illustrating another apparatus for presenting information according to an exemplary embodiment of the present disclosure. On the basis of the embodiment previously described as shown in FIG. 4, the presentation module 420 may further include a first detection submodule 423 and a first control submodule 424.

In an embodiment, the first detection submodule 423 is configured to detect whether there is an occurrence of a touch event in a preset detection region of the display screen.

In an embodiment, the detection region is an arbitrary region of the display screen.

The first control submodule 424 is configured to control the display screen to stop displaying the dark image when an occurrence of the touch event is detected in the detection region by the first detection submodule 423, such that the original locked screen interface is displayed.

As can be seen from the embodiment described above, if there is an occurrence of a touch event in the detection region preset on the display screen, the display screen is controlled to stop displaying the dark image, such that the original locked screen interface can be displayed. Accordingly, the selected object is no longer in a darkened state, such that additional display content can be displayed on the display screen which enables a user to quickly view the frequently-used information thereon, thereby improving the user experience.

Figure 7:
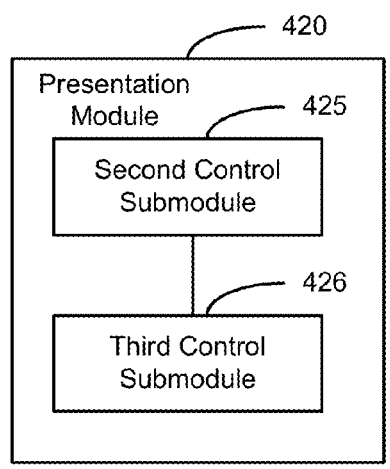
FIG. 7 is a block diagram illustrating another apparatus for presenting information according to an exemplary embodiment of the present disclosure.

FIG. 7 is a block diagram illustrating another apparatus for presenting information according to an exemplary embodiment of the present disclosure. As shown in FIG. 7, on the basis of the embodiment previously described as shown in FIG. 4, the presentation module 420 may further include a second control submodule 425 and a third control submodule 426.

The second control submodule 425 is configured to enable a first group of pixels of the display screen to a power-on state, such that the notification message is displayed.

In an embodiment, the first group of pixels correspond to a display region for the notification message.

The third control submodule 426 is configured to set all or a part of a second group of pixels of the display screen to a power-off state, such that the selected object is darkened.

In an embodiment, the second group of pixels correspond to a display region for the selected object.

As can be seen from the embodiment described above, when the notification message is presented, the pixels corresponding to the display region for the notification message are set to the power-on state and the pixels corresponding to the display region for the selected object are set to the power-off state. So the notification message can be presented in a highlighted way on the display screen, such that the content presented on the display screen is concise and easy to be read, which helps the user to focus on the notification message quickly and achieves a better presentation effect of the display screen. Moreover, power consumption of the terminal device can be also reduced since only the first group of pixels are set to the power-on state while the second pixels are set to the power-off state.

Figure 8:
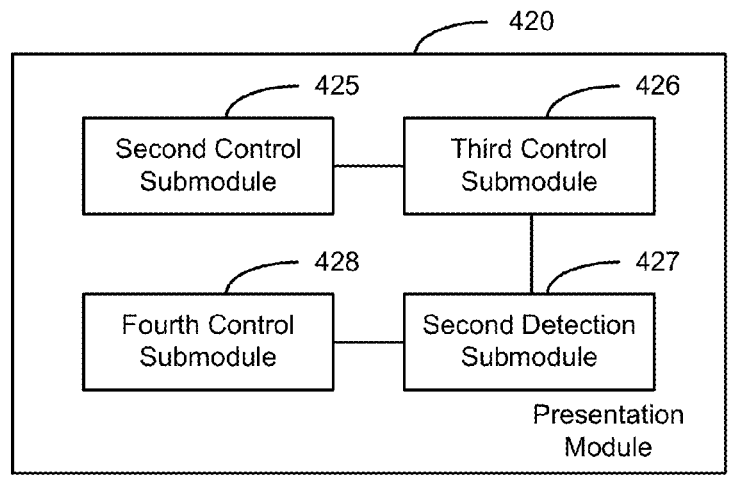
FIG. 8 is a block diagram illustrating another apparatus for presenting information according to an exemplary embodiment of the present disclosure.

FIG. 8 is a block diagram illustrating another apparatus for presenting information according to an exemplary embodiment of the present disclosure. As shown in FIG. 8, on the basis of the embodiment previously described as shown in FIG. 4, the presentation module 420 further includes a second detection submodule 427 and a fourth control submodule 428.

The second detection submodule 427 is configured to detect whether there is an occurrence of a touch event in a preset detection region of the display screen.

In an embodiment, the detection region is an arbitrary region of the display screen.

The fourth control submodule 428 is configured to switch the second group of pixels into the power-on state from the power-off state when the occurrence of the touch event is detected in the detection region by the second detection submodule 427, such that the selected object is displayed.

As can be seen from the embodiment described above, when there is an occurrence of a touch event in the detection region preset on the display screen, the second group of pixels in the power-off state are enabled to the power-on state so as to display the selected object. Accordingly, the selected object is no longer in a darkened state and additional display content can be displayed on the display screen, which enables a user to quickly view other frequently-used information thereon, thereby improving the user experience.

Figure 9:
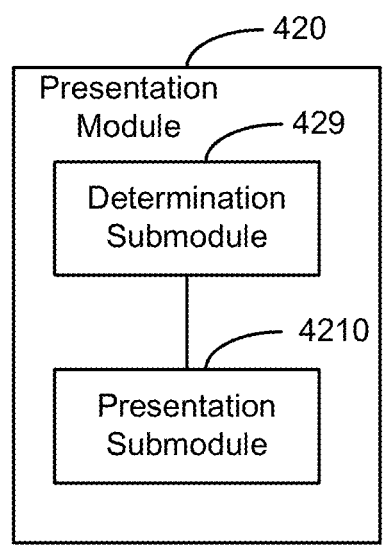
FIG. 9 is a block diagram illustrating another apparatus for presenting information according to an exemplary embodiment of the present disclosure.

FIG. 9 is a block diagram illustrating another apparatus for presenting information according to an exemplary embodiment of the present disclosure. As shown in FIG. 9, on the basis of the embodiment previously described as shown in FIG. 4, the presentation module 420 may further include a determination submodule 429 and a presentation submodule 4210.

The determination submodule 429 is configured to determine a respective presentation parameter for respective notification message according to the priority of the respective notification message, if a plurality of notification messages are received.

In an embodiment, presentation parameters of notification messages having different priorities may be the same or different, and the presentation parameter includes any one or more of a presented order, a luminance value, a font type, a font size and a color value.

The presentation submodule 4210 is configured to present the notification messages on the display screen according to the respective presentation parameter of the respective notification message.

As can be seen from the embodiment describe above, according to the present disclosure, the presentation parameter of the notification message may be determined according to the priority of the notification message. The presentation parameters of the notification messages having different priorities may be the same or different. By presenting the notification messages in one or more presentation parameters of a presented order, a luminance value, a font type, a font size and a color value, the notification messages can be presented in more rich forms, thereby improving the user experience.

Correspondingly, there is also provided a device for presenting information in the present disclosure. The device includes a processor; and a memory for storing instructions executable by the processor; and wherein the processor is configured to perform: receiving a notification message when a display screen is in a screen-off state; and darkening a selected object on the display screen and presenting the notification message, when the display screen is switched into a screen-on state from the screen-off state.

In an embodiment, the selected object includes all or partial content displayed on the display screen except the notification message.

With respect to the apparatuses in the above embodiments, the specific manners for performing operations for individual modules therein have been described in detail in the embodiments regarding the methods, which will not be elaborated herein.

The embodiments of the apparatus basically corresponds to the method embodiments, reference may be made to relative descriptions on the embodiments of the method. The embodiments of the apparatus are described only for the purpose of illustration. In an embodiment, those modules described as separate components may be or may be not physically separated. A component illustrated as a unit may be or may be not a physical unit, that is, it may be located at one place or may be distributed over a plurality of network units. A whole of a part of the modules therein can be selected as required to achieve the objects directed to by the present disclosure, which can be understood and implemented by those skilled in the art without inventive work.

Figure 10:
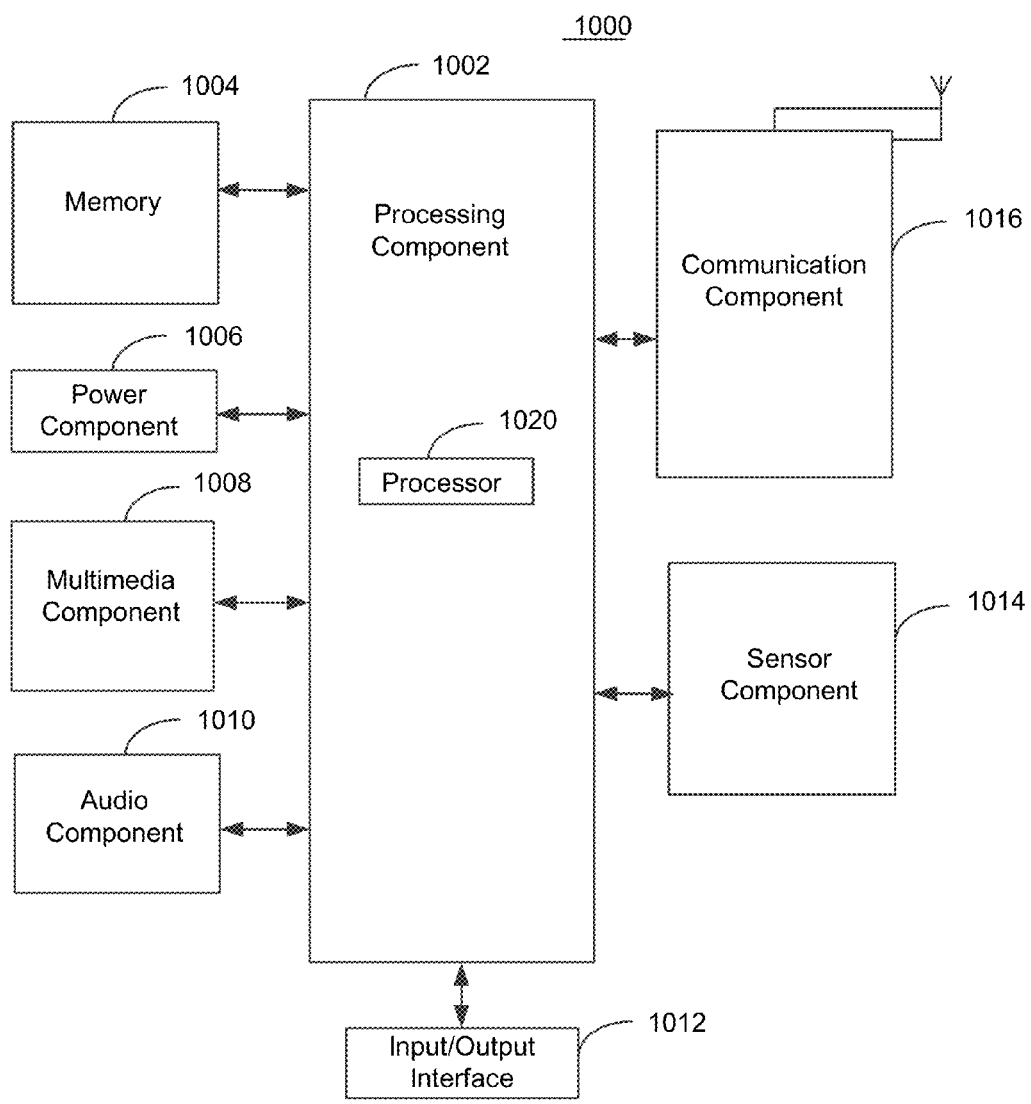
FIG. 10 is a block diagram illustrating a device for presenting information according to an exemplary embodiment of the present disclosure.

FIG. 10 is a block diagram illustrating a terminal device 1000 for presenting information according to an exemplary embodiment of the present disclosure. For example, the terminal device 1000 may be a mobile phone, a computer, a digital broadcast terminal, a messaging device, a gaming console, a tablet, a medical device, exercise equipment, a personal digital assistant, and the like.

Referring to FIG. 10, the terminal device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the terminal device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the terminal device 1000. Examples of such data include instructions for any applications or methods operated on the terminal device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the terminal device 1000. The power component 1006 may include a power management system, one or more power sources, and any other components associated with the generation, management, and distribution of power in the terminal device 1000.

The multimedia component 1008 includes a screen providing an output interface between the terminal device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the terminal device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the terminal device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the terminal device 1000. For instance, the sensor component 1014 may detect an open/closed status of the terminal device 1000, relative positioning of components, e.g., the display and the keypad, of the terminal device 1000, a change in position of the terminal device 1000 or a component of the terminal device 1000, a presence or absence of user contact with the terminal device 1000, an orientation or an acceleration/deceleration of the terminal device 1000, and a change in temperature of the terminal device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal device 1000 and other devices. The terminal device 1000 can access a wireless network based on a communication standard, such as WiFi, 2G or 3G or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1004, executable by the processor 1020 in the terminal device 1000, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a terminal device, enables the terminal device to perform a method for presenting information. The method include: receiving a notification message when a display screen is in a screen-off state; and presenting the notification message on the display screen with darkening a selected object, when the display screen is switched into a screen-on state from the screen-off state.

In an embodiment, the selected object includes all or partial content displayed on the display screen except the notification message.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

Above description is merely for purpose of illustrating preferable embodiments of the present disclosure rather than applying limitation thereto. Any modification, equivalent substitution or improvement made without departing from the spirit and principle of the disclosure should fall into protection scope of the present disclosure.

What is claimed is:

1. A method for presenting information on a display screen, comprising:
    receiving a notification message when the display screen is in a screen-off state; and
    presenting the notification message on the display screen with darkening a selected object, when the display screen is switched into a screen-on state from the screen-off state,
    wherein the selected object comprises all or partial content displayed on the display screen except the notification message,
    wherein presenting the notification message on the display screen with darkening the selected object comprises:
    displaying a preset dark image superposed on an upper layer over an original locked screen interface displayed on the display screen, such that the selected object is darkened; wherein the original locked screen interface is a display interface preset for the display screen being switched into the screen-on state from the screen-off state, the dark image is configured to cover the original locked screen interface entirely, and the dark image has a transparency lower than a preset threshold; and
    displaying the notification message superposed on an upper layer over the dark image.

2. The method according to claim 1, further comprising:
    detecting whether there is an occurrence of a touch event in a preset detection region of the display screen, wherein the detection region is an arbitrary region of the display screen; and
    controlling the display screen to stop displaying the dark image if an occurrence of the touch event is detected in the detection region, such that the selected object is displayed.

3. A method for presenting information on a display screen, comprising:
    receiving a notification message when the display screen is in a screen-off state; and
    presenting the notification message on the display screen with darkening a selected object, when the display screen is switched into a screen-on state from the screen-off state,
    wherein the selected object comprises all or partial content displayed on the display screen except the notification message,
    wherein presenting the notification message on the display screen with darkening the selected object comprises:
    displaying a preset dark image superposed on an upper layer over an original locked screen interface displayed on the display screen, such that the selected object is darkened; wherein the original locked screen interface is a display interface preset for the display screen being switched into the screen-on state from the screen-off state, the dark image is configured to cover the selected object, and the dark image has a transparency lower than a preset threshold; and
    displaying the notification message on the display screen.

4. The method according to claim 3, further comprising:
    detecting whether there is an occurrence of a touch event in a preset detection region of the display screen, wherein the detection region is an arbitrary region of the display screen; and
    controlling the display screen to stop displaying the dark image if an occurrence of the touch event is detected in the detection region, such that the selected object is displayed.

5. A method for presenting information on a display screen, comprising:
    receiving a notification message when the display screen is in a screen-off state; and
    presenting the notification message on the display screen with darkening a selected object, when the display screen is switched into a screen-on state from the screen-off state,
    wherein the selected object comprises all or partial content displayed on the display screen except the notification message, wherein presenting the notification message on the display screen with darkening the selected object comprises:

setting a first group of pixels of the display screen to a power-on state, such that the notification message is displayed, wherein the first group of pixels corresponds to a display region for the notification message; and setting a second group of pixels of the display screen to a power-off state, such that the selected object is darkened, the second group of pixels corresponds to a display region for the selected object.

6. The method according to claim 5, further comprising:
detecting whether there is an occurrence of a touch event in a preset detection region of the display screen, wherein the detection region is an arbitrary region of the display screen; and setting the second group of pixels to be switched into the power-on state from the power-off state if an occurrence of the touch event is detected in the detection region, such that the selected object is displayed.

7. The method according to claim 1, wherein presenting the notification message comprises:
when a plurality of notification messages are received, determining a presentation parameter for each of the plurality of the notification message according to a priority of the notification message, wherein the presentation parameter comprises one or more of a presented order, a luminance value, a font type, a font size and a color value; and presenting each of the plurality of the notification messages on the display screen according to the presentation parameter of the notification message.

8. The method according to claim 7, wherein the presentation parameters of any two of the plurality of the notification messages with different priorities may be the same or different.

9. A device for presenting information on a display screen, comprising:
a processor;
a memory for storing instructions executable by the processor; and
the display screen,
wherein the processor is configured to perform:
receiving a notification message when the display screen is in a screen-off state; and
presenting the notification message on the display screen with darkening a selected object, when the display screen is switched into a screen-on state from the screen-off state,
wherein the selected object comprises all or partial content displayed on the display screen except the notification message,
wherein presenting the notification message on the display screen with darkening the selected object comprises:
displaying a preset dark image superposed on an upper layer over an original locked screen interface displayed on the display screen, such that the selected object is darkened; wherein the original locked screen interface is a display interface preset for the display screen being switched into the screen-on state from the screen-off state, the dark image is configured to cover the original locked screen interface entirely, and the dark image has a transparency lower than a preset threshold; and
displaying the notification message superposed on an upper layer over the dark image.

10. The device according to claim 9, wherein, the processor is further configured to perform:
detecting whether there is an occurrence of a touch event in a preset detection region of the display screen, wherein the detection region is an arbitrary region of the display screen; and
controlling the display screen to stop displaying the dark image if an occurrence of the touch event is detected in the detection region, such that the selected object is displayed.

11. A device for presenting information on a display screen, comprising:
a processor;
a memory for storing instructions executable by the processor; and
the display screen,
wherein the processor is configured to perform:
receiving a notification message when the display screen is in a screen-off state; and
presenting the notification message on the display screen with darkening a selected object, when the display screen is switched into a screen-on state from the screen-off state,
wherein the selected object comprises all or partial content displayed on the display screen except the notification message,
wherein presenting the notification message on the display screen with darkening the selected object comprises:
displaying a preset dark image superposed on an upper layer over an original locked screen interface displayed on the display screen, such that the selected object is darkened; wherein the original locked screen interface is a display interface preset for the display screen being switched into the screen-on state from the screen-off state, the dark image is configured to cover the selected object, and the dark image has a transparency lower than a preset threshold; and
display the notification message on the display screen.

12. The device according to claim 11, wherein, the processor is further configured to perform:
detecting whether there is an occurrence of a touch event in a preset detection region of the display screen, wherein the detection region is an arbitrary region of the display screen; and
controlling the display screen to stop displaying the dark image if presence of the touch event is detected in the detection region, such that the selected object is displayed.

13. A device for presenting information on a display screen, comprising:
a processor;
a memory for storing instructions executable by the processor; and
the display screen,
wherein the processor is configured to perform:
receiving a notification message when the display screen is in a screen-off state; and
presenting the notification message on the display screen with darkening a selected object, when the display screen is switched into a screen-on state from the screen-off state,
wherein the selected object comprises all or partial content displayed on the display screen except the notification message, wherein presenting the notification message on the display screen with darkening the selected object comprising:
setting a first group of pixels of the display screen to a power-on state, such that the notification message is displayed, wherein the first group of pixels corresponds to a display region for the notification message; and
setting a second group of pixels of the display screen to a power-off state, such that the selected object is darkened, wherein the second group of pixels corresponds to a display region for the selected object.

14. The device according to claim 13, the processor is further configured to perform:
detecting whether there is an occurrence of a touch event in a preset detection region of the display screen, wherein the detection region is an arbitrary region of the display screen; and
setting the second group of pixels to be switched into the power-on state from the power-off state if an occurrence of the touch event is detected in the detection region, such that the selected object is displayed.

15. The device according to claim 9, wherein presenting the notification message comprises:
when a plurality of notification messages are received, determining a presentation parameter for each of the plurality of the notification messages according to a priority of the notification message, wherein the presentation parameter comprises any one or more of a presented order, a luminance value, a font type, a font size and a color value; and
presenting each of the plurality of the notification messages on the display screen according to the presentation parameter of the notification message.

16. The device according to claim 15, wherein the presentation parameters of any two of the plurality of the notification messages with different priorities may be the same or different.

17. A non-transitory computer-readable storage medium having stored therein instructions that, when executed by a processor of a device, causes the device to perform a method for presenting information on a display screen, the method comprising:
receiving a notification message when a display screen is in a screen-off state; and
presenting the notification message on the display screen with darkening a selected object, when the display screen is switched into a screen-on state from the screen-off state,
wherein the selected object comprises all or partial content displayed on the display screen except the notification message;
wherein presenting the notification message on the display screen with darkening the selected object comprises:
displaying a preset dark image superposed on an upper layer over an original locked screen interface displayed on the display screen, such that the selected object is darkened; wherein the original locked screen interface is a display interface preset for the display screen being switched into the screen-on state from the screen-off state, the dark image is configured to cover the original locked screen interface entirely, and the dark image has a transparency lower than a preset threshold; and
displaying the notification message superposed on an upper layer over the dark image.

18. The method according to claim 3, wherein presenting the notification message comprises:
when a plurality of notification messages are received, determining a presentation parameter for each of the plurality of the notification message according to a priority of the notification message, wherein the presentation parameter comprises one or more of a presented order, a luminance value, a font type, a font size and a color value; and
presenting each of the plurality of the notification messages on the display screen according to the presentation parameter of the notification message.

19. The method according to claim 18, wherein the presentation parameters of any two of the plurality of the notification messages with different priorities may be the same or different.

20. The method according to claim 5, wherein presenting the notification message comprises:
when a plurality of notification messages are received, determining a presentation parameter for each of the plurality of the notification message according to a priority of the notification message, wherein the presentation parameter comprises one or more of a presented order, a luminance value, a font type, a font size and a color value; and
presenting each of the plurality of the notification messages on the display screen according to the presentation parameter of the notification message.

21. The method according to claim 20, wherein the presentation parameters of any two of the plurality of the notification messages with different priorities may be the same or different.

22. The device according to claim 11, wherein presenting the notification message comprises:
when a plurality of notification messages are received, determining a presentation parameter for each of the plurality of the notification messages according to a priority of the notification message, wherein the presentation parameter comprises any one or more of a presented order, a luminance value, a font type, a font size and a color value; and
presenting each of the plurality of the notification messages on the display screen according to the presentation parameter of the notification message.

23. The device according to claim 22, wherein the presentation parameters of any two of the plurality of the notification messages with different priorities may be the same or different.

24. The device according to claim 13, wherein presenting the notification message comprises:
when a plurality of notification messages are received, determining a presentation parameter for each of the plurality of the notification messages according to a priority of the notification message, wherein the presentation parameter comprises any one or more of a presented order, a luminance value, a font type, a font size and a color value; and
presenting each of the plurality of the notification messages on the display screen according to the presentation parameter of the notification message.

25. The device according to claim 24, wherein the presentation parameters of any two of the plurality of the notification messages with different priorities may be the same or different.

* * * * *